(No Model.)

T. C. HOPPER.
Gas-Meter.

No. 227,783.  Patented May 18, 1880.

Witnesses
James T. Tobin,
Harry Smith.

Inventor
Thomas C. Hopper
by his Attorneys
Howson & Son

United States Patent Office.

THOMAS C. HOPPER, OF PHILADELPHIA, PENNSYLVANIA, ASSIGNOR TO THE AMERICAN METER COMPANY, OF SAME PLACE.

GAS-METER.

SPECIFICATION forming part of Letters Patent No. 227,783, dated May 18, 1880.

Application filed March 24, 1880. (No model.)

*To all whom it may concern:*

Be it known that I, THOMAS C. HOPPER, a citizen of the United States, residing in Philadelphia, Pennsylvania, have invented an Improvement in Gas-Meters, of which the following is a specification.

My invention relates to an improvement in that class of meters known as "wet meters," the object of my improvement being to prevent gas-consumers from defrauding the gas company by tilting the meter so as to change the position of the measuring-drum in respect to the level of the water, and thereby increase the capacity of the gas-chambers of the said measuring-drum.

This object I attain by combining with the dry well of the meter a valve and a pendent weight, whereby, on the tilting of the meter, the valve will close the entrance to said dry well and cut off the flow of gas, all as hereinafter more fully set forth.

Figure 1:
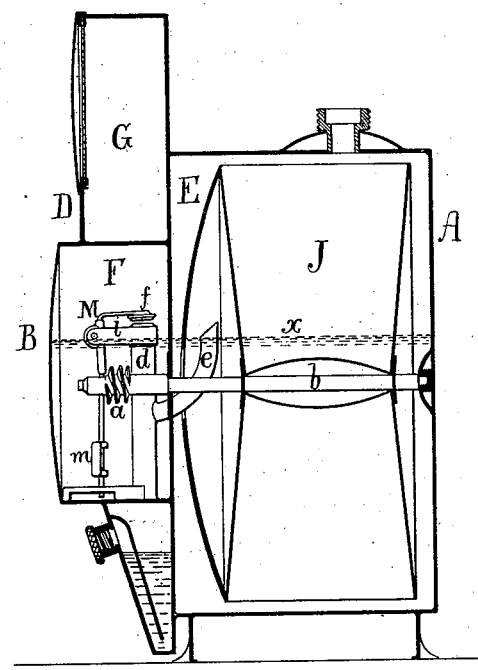
Figure 2:
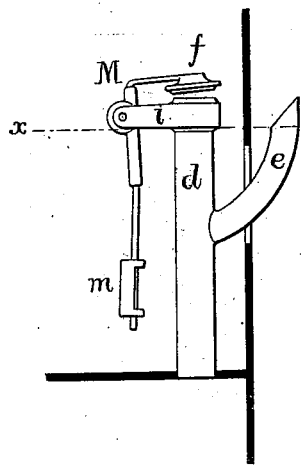
Figure 4:
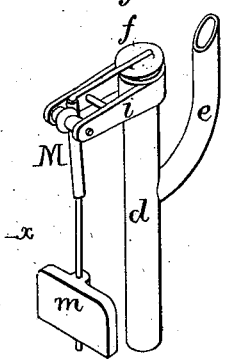
Figure 3:
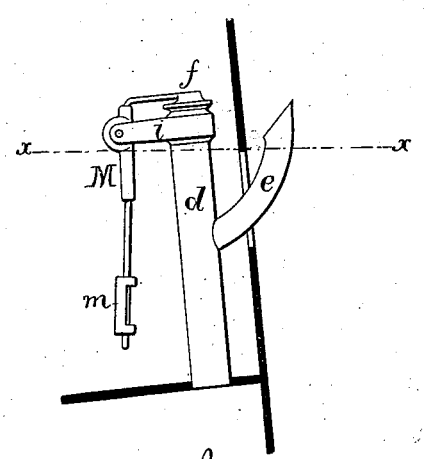

In the accompanying drawings, Figure 1 is a transverse section of a gas-meter with my improvements; Figs. 2 and 3, detached sections of part of the same drawn to an enlarged scale, and Fig. 4 a perspective view of the dry well and the attachment for controlling the flow of gas.

The outer casing of the meter comprises, as usual, the three parts A, B, and D, inclosing, respectively, the chambers E, F, and G, the chamber E containing the measuring-drum J, the chamber F serving to receive the gas before it passes into the drum J and chamber E, and the chamber G being adapted for the reception of the usual train of wheels whereby the pointers of the dials are operated from the worm $a$ on the shaft $b$ of the drum J, these wheels and the intermediate gearing not being shown in the drawings, however, as they have no bearing on my invention.

The gas passes from the chamber F through the dry well $d$ and its curved branch $e$ into one of the gas-chambers of the drum J, the level $x$ of the water in the meter being even with the mouth of said branch, and the entrance of the gas into the chambers of the drum causing the rotation of the latter in the usual manner, the gas escaping from the drum into the chamber E, from which it is conveyed by pipes to the burners.

The drum is so constructed and arranged in respect to the dry well and its branch and to the registering-gearing that the proper measuring operation will be effected only when the meter is level, and dishonest persons defraud gas companies by tilting the meter forward so as to alter the position of the measuring-drum in respect to the level $x$ of the water, and thereby increase the size of the gas-chambers of said drum—that is, the portions above the water-level.

In order to defeat any attempt of this sort I combine with the dry well a valve, $f$, carried by the short arm of a bell-crank lever, M, hung to projections $i$ on the well, the long arm of said lever M carrying a weight, $m$, and being guided between suitable projections on the bottom of the casing B.

On reference to Fig. 2 it will be observed that when the meter is level the valve $f$ will occupy a position slightly above the mouth of the dry well $d$, and will not interfere with the free passage of gas into said well from the chamber F; but when the meter is tilted forward, as shown in Fig. 3, the pendent weight $m$, preserving its position, will cause such an operation of the valve $f$ as to close the mouth of the well $d$ and prevent the passage of gas through the same and into the measuring-drum.

It is not absolutely necessary that the lever M, carrying the valve $f$ and weight $m$, should be hung to the dry well, as said lever might, for instance, be hung to a shaft extending longitudinally across the chamber F. The construction shown, however, is preferred on account of its compactness and simplicity.

I claim as my invention—

1. The combination of the dry well of a wet gas-meter with a valve and a pendent weight controlling the position of the said valve, whereby, on the tilting of the meter, the valve will close the gasway of the dry well and cut off the flow of gas, all substantially as set forth.

2. The combination of the dry well $d$, having projections $i$, with the lever M, hung to said projections and carrying the valve $f$ and weight $m$, as set forth.

In testimony whereof I have signed my name to this specification in the presence of two subscribing witnesses.

THOMAS C. HOPPER.

Witnesses:
 JAMES F. TOBIN,
 HARRY SMITH.